Oct. 28, 1952  A. G. PERKINS  2,615,423
CONTROL UNIT FOR MILKING MACHINES
Filed Nov. 17, 1950  2 SHEETS—SHEET 1

INVENTOR
Albert G. Perkins
BY Walter P. Guyer
ATTORNEY

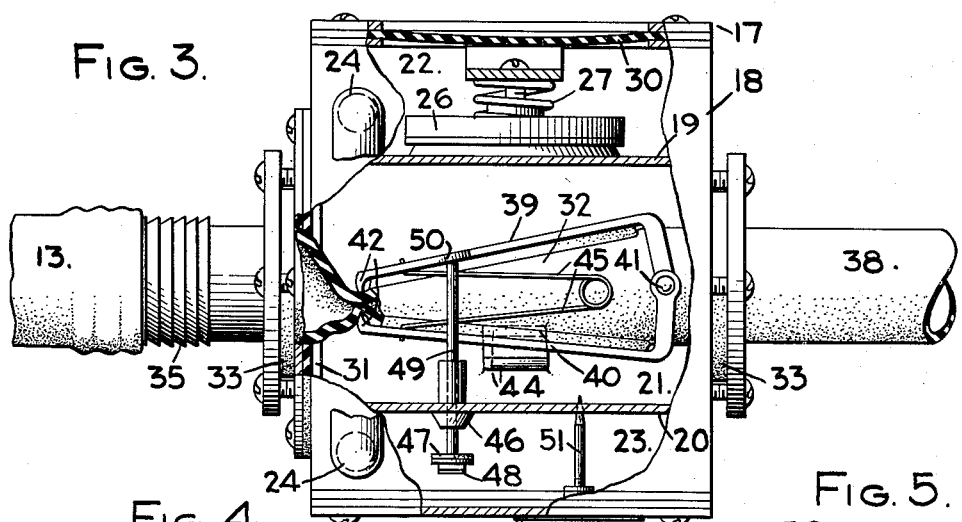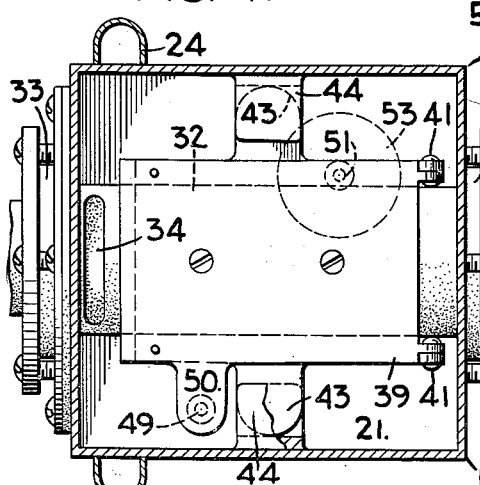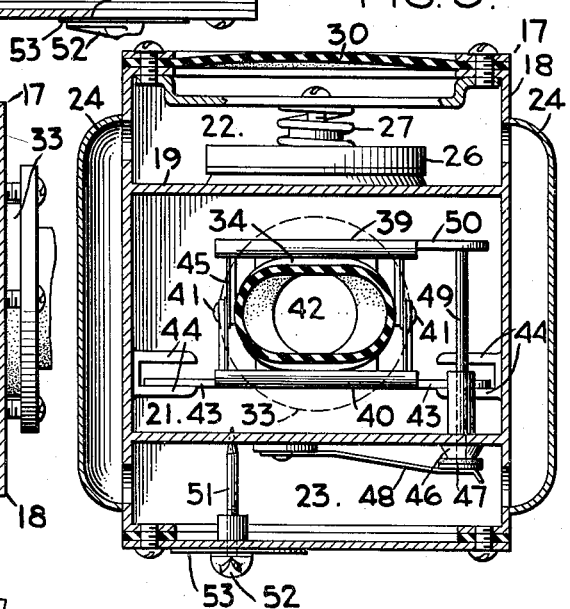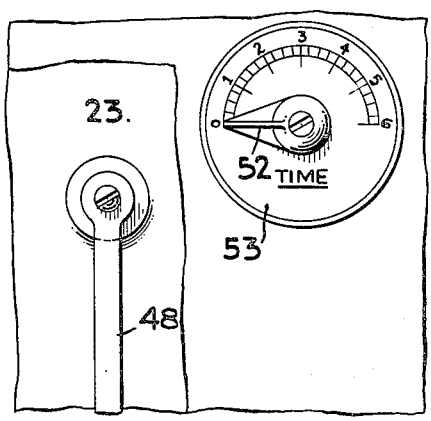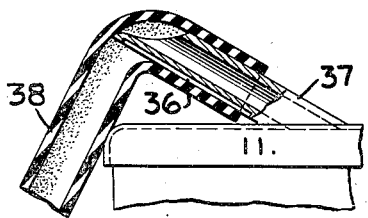

Patented Oct. 28, 1952

2,615,423

UNITED STATES PATENT OFFICE 2,615,423

CONTROL UNIT FOR MILKING MACHINES

Albert G. Perkins, Grand Island, N. Y.

Application November 17, 1950, Serial No. 196,221

12 Claims. (Cl. 119—14.08)

1

This invention relates to an automatic control for milking machines but more particularly to a control unit for causing the automatic dropping of the teat cups from the cow as the respective quarters of the cow's bag are milked out and thereby prevent injury to the cow when the machine is left on too long.

It has for one of its objects to provide a self-contained device of this character which is provided with manually-adjustable means for pre-setting the timing of the milking operation for a given teat connection, so that upon the lapse of such time period the device will automatically function to shut off the vacuum to the companion quarter of the cow's bag to thereupon cause that teat cup to be released and drop by gravity from the cow.

Another object of the invention is to provide a teat cup connection control unit adapted to be interposed in such connection and having a novel milk-flow tube contracting valve-like assembly and fluid means for governing the same including a pre-set adjustable time control for insuring the actuation of the valve assembly to cut off the vacuum to the teat cup upon the expiration of the time for which the control may be set.

Other features of the invention reside in the construction and arrangement of parts hereinafter described and particularly pointed out in the appended claims.

In the accompanying drawings—

Figure 1:
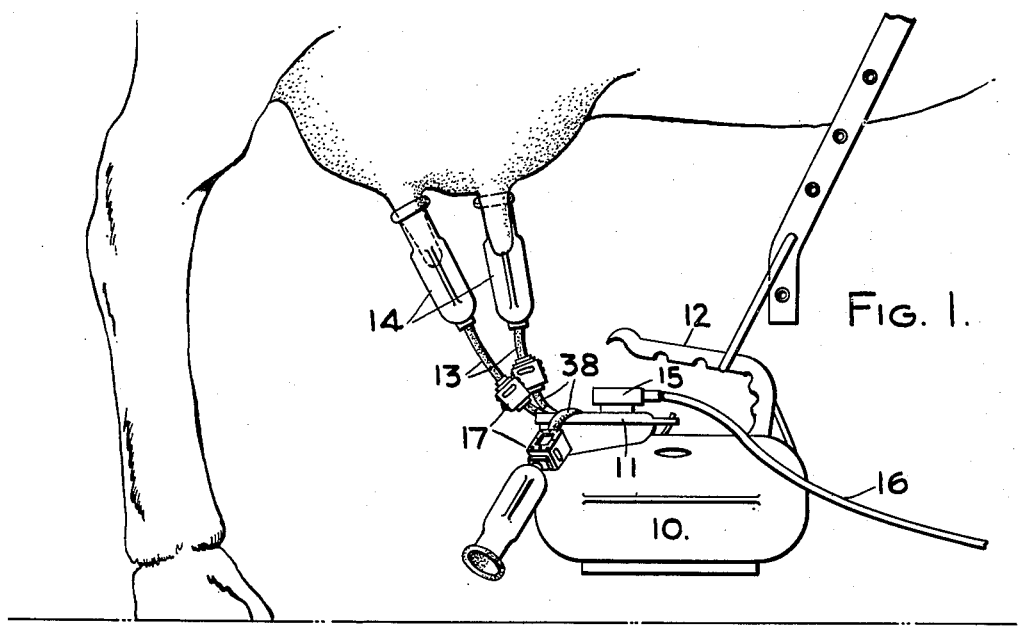
Figure 2:
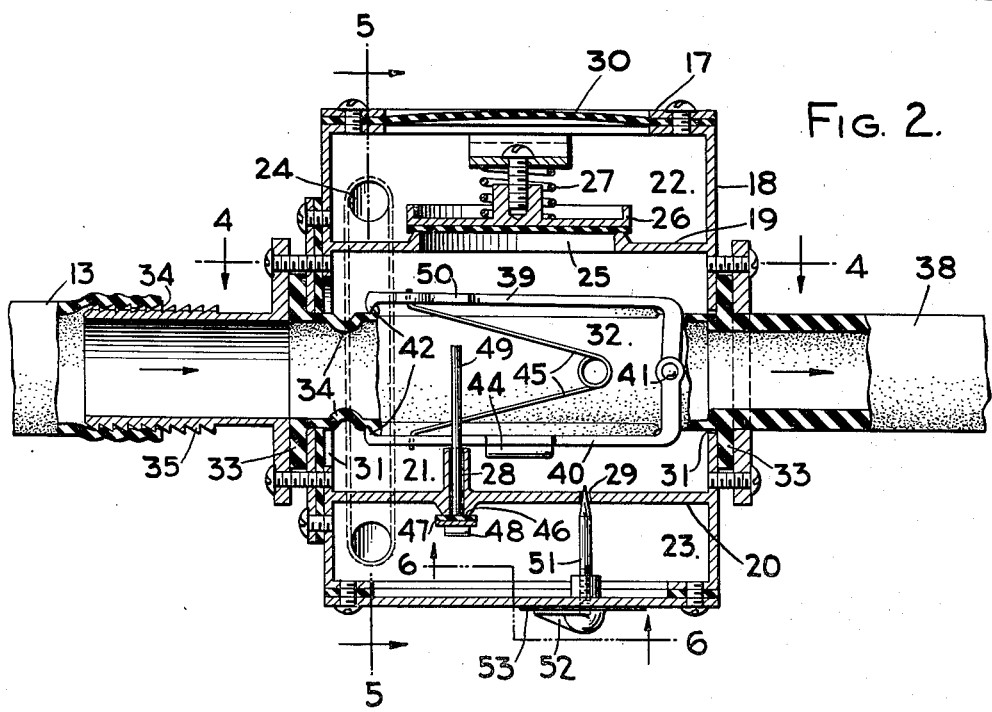

Figure 1 is a side view of a milking machine suspended in operative relation to the cow and showing my control devices in the teat cup connections thereof, one of the cups being shown as having been automatically released from the cow. Figure 2 is an enlarged longitudinal section of one of the devices in its milking position. Figure 3 is a similar view, partly in elevation, showing the parts in a shut-off position. Figure 4 is a horizontal section taken on line 4—4, Figure 2. Figure 5 is a transverse section taken on line 5—5, Figure 2. Figure 6 is a fragmentary horizontal section taken on line 6—6, Figure 2. Figure 7 is a fragmentary sectional view showing the vented position of a teat cup connection to the cover spout of the milking machine.

Similar characters of reference indicate corresponding parts throughout the several views.

By way of example, I have shown my teat cup dropping control device or controlled quarter milker device applied to a well known type of pulsating milking machine wherein 10 indicates the milk-receiving can having a cover 11 and bail 12, the cover having milk-intake tubes radiating therefrom and each connected by a flexible conduit or hose connection 13 having a teat cup 14 at its free end for detachable connection to one of the cow's teats. Also applied to the cover is the customary pulsator 15 which is connected by a hose 16 to the suction source. Interposed substantially axially in each hose connection 13 is one of my control units, indicated generally by the numeral 17, through which the milk flows from the cow to the can, and which performs as a valve, as each quarter of the cow's bag is milked out, to automatically shut off the vacuum thereto and cause the companion teat cup to drop from the cow, as depicted in Figure 1, to effectually prevent injury to the cow from overmilking, and subsequently cause the automatic restoration of the unit to its initial position.

In the preferred embodiment of my invention shown in the drawings, each control unit consists of a fluid-filled body or casing 18 having upper and lower partitions 19 and 20 therein dividing it into a central or intermediate fluid control chamber 21, and upper and lower fluid chambers or reservoirs 22 and 23 connected in intercommunicating relation with each other through the medium of a pipe or passage 24. The upper partition 19 has a port 25 therein normally closed by a check valve 26 backed by a spring 27 but free to open in response to a pressure flow of the fluid from the intermediate chamber to the upper chamber, while the lower partition 20 has valve-controlled vent ports 28 and 29 therein whereby communication between the several chambers is established in automatically controlling the device to shut off the vacuum to a given teat cup and in restoring the device to its normal position upon the release of the teat cup from the cow. The top wall of the upper chamber 22 includes a displaceable diaphragm 30 secured at its marginal edges to the flanged top of the casing 18.

At its opposite ends and substantially centrally of the fluid control chamber 21, the casing has openings 31 through which extend the intake and discharge ends of a flexible, contractible tube-like conduit section or valve member 32 of rubber or like material in fluid-sealed relation to such chamber and in interposed milk flow communication with the companion teat cup connection 13. At its ends this tube section has attaching flanges 33 and at its intake end within the chamber has corrugations 34 in its top and bottom sides to allow it to readily flex when contracted to the closed or sealed position shown in Figure 3. A capillary-like vent passage 34 between the teat cup connection and the adjoining tube section attaching nipple 35 to properly vent the connection and its teat cup to the atmosphere after the tube section has been collapsed or contracted, as hereinafter described, to permit the teat cup to drop from the cow. A similar vent passage 36 is provided in the underside of each of the intake spouts 37 of the cover 11, as shown in Figure 7, with the tube section 32 having at its machine-connecting end an extension 38 encircling such spout for the purpose of properly venting the control unit to restore the collapsed tube section 32 and its associated parts to their initial position after the teat cup drops from the cow. It will be noted from Figure 7, that in the dropped position shown, the top side of the tube extension 38 closes over and seals the intake end of the spout to close off the vacuum to the control unit.

Applied to diametrically opposite faces of the contractible tube section 32 between its flanges 33 for causing its uniform collapse to a closed position to shut off the vacuum to the teat cup are top and bottom plates 39, 40 hinged at one end to each other at 41 in substantially the axial plane of such tube section and provided at their opposite or free ends with tube-engaging jaws or elements 42 for biting into and sealing the tube section in its contracted position shown in Figure 3. The bottom jaw-plate 40 has laterally-extending lugs 43 at its opposite side edges which extend freely into companion bifurcated lugs 44 formed on the interior of the opposite side walls of the body 18, as shown in Figure 5, for the purpose of limiting the swinging movement of such jaw plate to a minimum while the top jaw plate 39 is free to swing a greater amount to more accurately govern the final collapse of the tube section. Coil springs 45 are disposed between the jaw plates with their legs joined thereto, as seen in Figure 2, to normally urge them to their expanded position shown in Figure 2. These springs are comparatively light so as not to resist the tendency of the vacuum to collapse the tube section 32 during the milking operation.

In addition to the valved port 25 which is forced open during the expanding action of the tube section 32, after its collapse to a vacuum sealing position, to permit a compensating volume of fluid to be quickly displaced from the central chamber 21 into the adjoining chambers 22, 23 to restore the device to normal, I provide the valve-controlled vent ports 28 and 29 for governing the compensating flow of fluid from the chambers 22, 23 into the central chamber 21 as the tube section 32 is undergoing collapse. The port 28, terminates at its lower end within the chamber 23 in a downwardly-facing valve-seat 46, with a fluid release valve 47 normally urged against the seat by a flat spring 48 to close such port. This valve has a stem 49 rising freely through the port 28 into the central chamber and terminates at its upper end in spaced relation to the expanded upper jaw-plate 39, the latter having a lateral extension 50 at one side thereof for abutting contact with such stem at a predetermined time in the contracting stroke of the upper jaw-plate as the tube-section is undergoing collapse to a vacuum closing position. Disposed in operative relation to the companion port 29 is an adjustable needle valve 51 which functions as a selective control for timing the contraction of the tube section to its collapsed shut off position and which is mounted on the bottom wall of the casing 18 and has a combined handle and pointer 52 at its lower or outer end traversing a time-calibrated dial 53. By adjusting this needle valve to the size of its port opening companion to the milking time desired, say a dial setting of two minutes for the front quarters of the cow and three minutes for its rear quarters, such settings will govern the predetermined rate of flow of the fluid from the outer chambers 22, 23 into the inner control chamber 21, it being understood that during the operation of the milking machine the vacuum in the system causes the tube section 32 and its hinged jaw-plates 39, 40 to contract gradually and this results in a compensating volume of fluid being forced through the needle valve port 29 into the tube section contained chamber with the diaphragm wall 30 being correspondingly displaced inwardly. When the upper jaw-plate 39 is partially collapsed, it lateral extension 50 encounters the stem 49 of the valve 47 and with the continuing collapse of such jaw-plate the valve is opened and a further volume of fluid flows from the outer fluid chambers to the inner one with the result that the tube section 32 is thereupon fully and finally collapsed to its vacuum closed position shown in Figure 3, and the milk from that companion quarter of the cow's bag is automatically shut off and the teat cup is released and drops from the cow in the pendant inverted position relative to the can 10, as shown in Figure 1. With the shutting off of the vacuum to the teat cup, atmosphere is admitted to the cup connection 13 through the vent 34 and this results in the teat cup being released from the cow. As shown in Figure 7, the cup connection folds over the spout 37 to steal off the vacuum to the opposing end of the control unit and at the same time vent the same to the atmosphere through the vent passage 36, which results in the inflation or expansion of the tube-section 32 and its embraced jaw-plates to their normal position shown in Figure 2. During this tube-expanding cycle, a compensating volume of fluid is forced comparatively quickly from the control chamber 21 into the outer reservoir chambers 22, 23 through the port 25, whose valve 26 is caused to open by fluid pressure. When the jaw-plate 39 recedes from the valve-stem 49, the valve 47 is returned to its closed position by its spring 48.

I claim as my invention:

1. A control device of the character described, comprising a body having a fluid filled control chamber and a reservoir in valved communication therewith, a flexible contractible tube section extending through said chamber in fluid-sealed relation thereto and adapted for connection to a conduit for conducting liquid by vacuum from a source of supply to a receiving container, means in substantially embracing relation to said tube section to move and contract therewith, and valve means adjustable to one or another of a plurality of positions for controlling the flow of fluid from the reservoir into the control chamber and governing the time-contraction of the tube section to its closed sealed position.

2. A control device of the character described, comprising a body having a fluid filled control chamber and a reservoir in valved communication therewith, a flexible contractible tube section extending through said chamber in fluid-sealed relation thereto and adapted for connection to a conduit for conducting liquid by vacuum from a source of supply to a receiving container, means in substantially embracing relation to said tube section to move and contract therewith, valve means adjustable to one or another of a plurality of positions for controlling the flow of fluid from the reservoir into the control chamber and governing the time-contraction of the tube section to its closed sealed position, and a normally-closed fluid pressure release valve in governed relation to said tube section embracing means for effecting its opening at a predetermined time in the contraction of the tube section.

3. A control device for milking machines, comprising a body having a fluid-filled chamber and an adjoining reservoir in valved communication therewith for controlling the flow of fluid therebetween, one of the walls of the reservoir including a flexible diaphragm adapted to expand and contract in accordance with the flow of fluid to and from the same, a teat cup connection in operative relation to said body for conducting the milk by vacuum from the cow to a receiving can and including a collapsible tube section extending through said chamber in fluid-sealed relation thereto, means applied to diametrically opposite sides of said tube section for contractible movement therewith to a closed sealed position, normally closed fluid vent valve means between said chamber and said reservoir having a stem in operative relation to said contractible means to cause the opening of such valve means upon a partial collapse of said tube section, and an adjustable needle valve between said chamber and said reservoir for regulating the flow of fluid from the latter to the former and for governing the gradual contraction of the tube section to its closed sealed position.

4. A control device for milking machines, comprising a body having a fluid-filled chamber and an adjoining reservoir in valved communication therewith for controlling the flow of fluid therebetween, one of the walls of the reservoir including a flexible diaphragm adapted to expand and contract in accordance with the flow of fluid to and from the same, a teat cup connection in operative relation to said body for conducting the milk by vacuum from the cow to a receiving can and including a collapsible tube section extending through said chamber in fluid-sealed relation thereto, means applied to diametrically opposite sides of said tube section for contractible movement therewith to a closed sealed position, a one-way check valve for normally preventing flow of fluid from the reservoir to said chamber, an adjustable needle valve for regulating the flow of fluid from the reservoir to the chamber for governing the gradual contraction of the tube section to its closed sealed position, and a normally-closed fluid pressure release valve in governed relation to said tube section contractible means for effecting its opening at a predetermined time in the contraction of the tube section.

5. A control device for milking machines, comprising a body having a fluid-filled chamber and an adjoining reservoir in valved communication therewith for controlling the flow of fluid therebetween, a teat cup connection in operative relation to said body for conducting the milk by vacuum from the cow to a receiving can and including a collapsible tube section extending through said chamber in fluid-sealed relation thereto, plates applied to diametrically opposite sides of said tube section and hingedly connected at one end to each other and provided at their other ends with tube-engaging elements for releasable contractible engagement with the tube section, and means within said body-chamber and engageable with one of said plates for limiting its hinging movement.

6. A control device for milking machines, comprising a body having a fluid-filled chamber and an adjoining reservoir in valved communication therewith for controlling the flow of fluid therebetween, a teat cup connection in operative relation to said body for conducting the milk by vacuum from the cow to a receiving can and including a collapsible tube section extending through said chamber in fluid sealed relation thereto, and means applied to diametrically opposite sides of said tube section in hinged relation at one end and having opposing jaw-like elements at their other ends for releasable contractible engagement with the tube section, that portion of said tube section adjoining said jaw-like elements having corrugations in its companion diametrically opposite sides.

7. A control device for milking machines, comprising a teat connection, a body adapted to be interposed in said teat connection and having a fluid filled control chamber and a reservoir in valved communication therewith, a flexible contractible tube section extending through said chamber in fluid-sealed relation thereto and adapted for vacuum and milk flow communication with the teat cup connection, means in substantially embracing relation to said tube section to move and contract therewith in response to the variation in the vacuum therein and the change of fluid pressure in said chamber, valve means adjustable to one or another of a plurality of positions for controlling the flow of fluid from the reservoir into the control chamber and governing the time-contraction of the tube section to its closed sealed position, said valve means having a pointer thereon, and a time-calibrated dial applied to said body and with which said pointer is adapted to traverse.

8. A control device for milking machines, comprising a teat cup connection for conducting milk by vacuum from the cow to a receiving container, a body interposed in said teat connection and including a tube section, subject to vacuum collapse, in flow communication with the teat connection and constituting a valve member therefor, and adjustable milking period timing means in operative relation to said tube section for restraining its collapse to a fully closed position until the lapse of the time period for which such means is adjusted.

9. A control device for milking machines, comprising a teat cup connection for conducting milk by vacuum from the cow to the receiving container, a body interposed in said teat connection and including a tube section, subject to vacuum collapse, in flow communication with the teat connection and constituting a valve member therefor, means in substantially embracing relation to said tube section to move therewith in response to the variation in vacuum therein to and from a closed flow-sealing position, and selective time control means in governing relation to said tube section for restraining its collapse to a closed position until after the lapse of a predetermined time period.

10. A control device for milking machines, comprising a teat cup connection for conducting milk by vacuum from the cow to a receiving container, a body interposed in said teat connection and including a tube section, subject to vacuum collapse, in flow communication with the teat connection and constituting a valve member therefor, means in substantially embracing relation to said tube section to move therewith in response to the variation in vacuum therein to and from a closed flow-sealing position, displaceable means in operative governing relation to said tube section for restraining its complete collapse, and selective time control means in governing relation to said displaceable means for rendering the latter inoperative to restrain the collapse and for pre-setting the time of contraction of said tube section to shut off the vacuum and milk flow from the cow to the container.

11. A control device for milking machines, comprising a teat cup connection for conducting milk by vacuum from the cow to a receiving container, a body interposed in said teat connection and including a tube section, subject to vacuum collapse, in flow communication with the teat connection and constituting a valve member therefor, means in operative relation to said tube section for restraining its collapse under vacuum to a shut off position, and control means in operative governing relation to said restraining means and adjustable to one or another of a plurality of time control positions for rendering such restraining means ineffective after the lapse of a predetermined time and permit the collapse of the tube section to its shut off position.

12. A control device for milking machines, comprising a teat cup connection for conducting milk by vacuum from the cow to a receiving container, a body interposed in said teat connection and including a tube section, subject to vacuum collapse, in flow communication with the teat connection and constituting a valve member therefor, means in operative relation to said tube section for releasably restraining its collapse in opposition to that of the vacuum tending to close it, and means in operative correlation to said restraining means for varying the time element of its restraining action and relieve said tube section therefrom after the lapse of a predetermined time to permit is automatic collapse under vacuum to a closed position.

ALBERT G. PERKINS.

REFERENCES CITED

The following references are of record in the file of this patent:

UNITED STATES PATENTS

| Number | Name | Date |
| --- | --- | --- |
| 2,558,152 | Perkins | June 26, 1951 |